United States Patent
Juncker et al.

(10) Patent No.: US 11,328,166 B2
(45) Date of Patent: May 10, 2022

(54) AUTHENTICATION METHOD FOR AN ELECTRONIC DEVICE

(71) Applicant: Fingerprint Cards AB, Gothenburg (SE)

(72) Inventors: Carsten Juncker, Herlev (DK); Klaus S. Andersen, Hvidovre (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/968,910

(22) PCT Filed: Feb. 11, 2019

(86) PCT No.: PCT/SE2019/050113
§ 371 (c)(1),
(2) Date: Aug. 11, 2020

(87) PCT Pub. No.: WO2019/160478
PCT Pub. Date: Aug. 22, 2019

(65) Prior Publication Data
US 2021/0049392 A1    Feb. 18, 2021

(30) Foreign Application Priority Data
Feb. 16, 2018    (SE) .................................... 1850172-6

(51) Int. Cl.
*G06K 9/00*    (2022.01)
*G06F 3/041*    (2006.01)
*G06F 21/32*   (2013.01)
*G06K 9/62*    (2022.01)

(52) U.S. Cl.
CPC ....... *G06K 9/00912* (2013.01); *G06F 3/0412* (2013.01); *G06F 21/32* (2013.01); *G06K 9/00067* (2013.01); *G06K 9/00087* (2013.01); *G06K 9/6202* (2013.01)

(58) Field of Classification Search
CPC .......... G06K 9/00912; G06K 9/00067; G06K 9/00087; G06K 9/6202; G06K 9/22; G06F 3/0412; G06F 21/32
See application file for complete search history.

(56) References Cited

U.S. PATENT DOCUMENTS

| | | |
|---|---|---|
| 6,757,410 B1 | 6/2004 | Nakashima |
| 6,970,582 B2 | 11/2005 | Langley |
| 8,836,478 B2 | 9/2014 | Bond et al. |
| 2010/0158327 A1 | 6/2010 | Kangas et al. |
| 2013/0234825 A1 | 9/2013 | Malhotra et al. |

(Continued)

FOREIGN PATENT DOCUMENTS

EP    3252590 A1    12/2017

OTHER PUBLICATIONS

PCT International Search Report and Written Opinion dated Apr. 8, 2019 for International Application No. PCT/SE2019/050113, 11 pages.

(Continued)

*Primary Examiner* — Abhishek Sarma
(74) *Attorney, Agent, or Firm* — RMCK Law Group, PLC (57) ABSTRACT

The present disclosure relates to a method of authenticating a user by means of an electronic device comprising a user output interface. The present disclosure also relates to a corresponding electronic device and to a computer program product.

15 Claims, 6 Drawing Sheets

(56) References Cited

U.S. PATENT DOCUMENTS

| | | | |
|---|---|---|---|
| 2014/0079300 A1 | 3/2014 | Wolfer et al. | |
| 2014/0359757 A1 | 12/2014 | Sezan et al. | |
| 2015/0036065 A1 | 2/2015 | Yousefpor et al. | |
| 2015/0220767 A1* | 8/2015 | Yoon | G06K 9/00006 382/124 |
| 2016/0063298 A1 | 3/2016 | Tuneld et al. | |
| 2016/0225209 A1 | 8/2016 | Malhotra et al. | |
| 2016/0246396 A1 | 8/2016 | Dickinson et al. | |
| 2016/0246955 A1 | 8/2016 | Jiang | |
| 2016/0342781 A1 | 11/2016 | Jeon | |
| 2017/0193209 A1 | 7/2017 | Mohan | |
| 2017/0308732 A1* | 10/2017 | Wang | G06F 3/0488 |
| 2018/0012057 A1* | 1/2018 | Cho | G06K 9/00087 |

OTHER PUBLICATIONS

Extended European Search Report dated Oct. 1, 2021 for European Patent Application No. 19754691.4, 8 pages.

\* cited by examiner

AUTHENTICATION METHOD FOR AN ELECTRONIC DEVICE

CROSS-REFERENCE TO RELATED APPLICATIONS

This application is a 371 U.S. National Stage of International Application No. PCT/SE2019/050113, filed Feb. 11, 2019, which claims priority to Swedish Patent Application No. 1850172-6, filed Feb. 16, 2018. The disclosures of each of the above applications are incorporated herein by reference in their entirety.

TECHNICAL FIELD

The present disclosure relates to a method of authenticating a user by means of an electronic device comprising a user output interface. The present disclosure also relates to a corresponding electronic device and to a computer program product.

BACKGROUND

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal, ultrasonic, etc.), capacitive sensing is currently most commonly used, in particular in applications where size and power consumption are important issues. The most common fingerprint sensors currently used have a size e.g. corresponding to a fingertip (or smaller).

However, recently there has been a trend towards larger area fingerprint sensors. In relation to e.g. a mobile phone provided with a touch screen covering a majority of the front side of the mobile phone, such a large area fingerprint sensor may possibly be arranged such that it may be possible to capture a fingerprint image (of a finger of a user) essentially anywhere throughout a total surface area provided by the touch screen.

An example of such a larger area fingerprint sensor implementation is presented in US20150036065, specifically suggesting that the fingerprint sensor is incorporated in a display stack in the electronic device. Such an implementation allows for further enhancements in regards to usability for a user of the electronic device, such as for example in regards to unlocking the electronic device, signing a transaction, etc.

Even though US20150036065 present an interesting approach in regards to large area fingerprint sensors, US20150036065 is completely silent in regards to how such an implementation possibly could be exploited for also further enhancing the security for the user of the electronic device. Accordingly, there appears to room for allowing for further functionality to be implemented in regards to an electronic device comprising a large area fingerprint sensor, with specific focus on improved usability and security.

SUMMARY

According to an aspect of the present disclosure, it is therefore provided a method of authenticating a user by means of an electronic device comprising a user output interface, a fingerprint sensing system adapted to acquire fingerprint information of a user's finger and a control unit, wherein the method comprises the steps of presenting a first instruction, by the user output interface, to the user for arranging a first finger at a first location with a first rotation, acquiring, by the fingerprint sensing system, a first portion of the fingerprint information, determining, by the control unit, a first matching level between the first portion of the fingerprint information and a combination of a previously enrolled fingerprint template, the first location and the first rotation, presenting a second instruction, by the user output interface, to the user for arranging a second finger at a second location with a second rotation, wherein at least one of the second finger, the second location, and the second rotation is different from the first finger, the first location, and the first rotation, respectively, acquiring, by the fingerprint sensing system, a second portion of the fingerprint information, determining, by the control unit, a second matching level between the second portion of the fingerprint information and a combination of the fingerprint template, the second location and the second rotation, authenticating, by the control unit, the user based on the first and the second matching level.

The present disclosure is based upon the realization that security may be enhanced for an electronic device comprising a fingerprint sensing system by means of providing the user of the electronic device with precise instructions on when and how to place the finger for acquisition of fingerprint information relating to the finger of the user.

That is, in line with the present disclosure the user is presented with a first instruction of how to position his finger in relation to an active sensing area of the fingerprint sensing system, followed by the acquisition of a first portion of the fingerprint information, such as a first fingerprint image. Subsequently, a second instruction is presented to the user, with a new requirement as to how the user is to position his finger in relation to the active sensing area of the fingerprint sensing system, and then a second portion of the fingerprint information is to be acquired by the fingerprint sensing system, such as a second fingerprint image.

Following the acquisition of the first as well as the second fingerprint image the control unit comprised with the electronic device will perform a determination of how well the finger was aligned with the instructions provided. In addition, a comparison will be performed between the acquired fingerprint images and a previously enrolled fingerprint template for the user's finger(s). It should be understood that it, depending on the technology used for acquiring the fingerprint images, may be necessary to arrange/form the fingerprint template to be rotationally dependent in relation to the active sensing area of the fingerprint sensing system. That is, some fingerprint sensing technologies will generate rotationally non-invariant fingerprint images, meaning that the fingerprint images will change depending on the rotation of the finger in relation to the active sensing area of the fingerprint sensing system. Thus, this may in some implementations make it a desire to form the fingerprint template for different rotations of the finger.

An advantage with the present disclosure is that there is a possibility of introducing unpredictability functionality when verifying the user of the electronic device.

That is, the user must not only have the correct fingerprint (i.e. to successfully be compared to the previously enrolled fingerprint template), rather also the positioning of the finger in relation to the active sensing area of the fingerprint sensing system must be correct, or at least within an adequate level of matching (matching level above the predetermined threshold).

Accordingly, it is desirable to allow the instructions to be somewhat unpredictable to the user of the electronic device. That is, rather than allowing the first and the second instruction to be the same at each time the user is to be verified, the first and the second instruction may possibly be selected somewhat at random or with a pattern/order that is non-expected for the user. Thus, the user will not in beforehand know how to position the finger at the active sensing area of the fingerprint sensing system which in turn will reduce the possibility of spoofing the verification process. It may in also, in an alternative embodiment, be possible to allow the user to select the pattern/order, e.g. where the user is to place his finger.

In an embodiment of the present disclosure the first finger is the same as the second finger, and the second instruction is presented subsequently the first instruction after a predetermined time period. Thus, the user may for example first be instructed to position his right index finger at a first rotation and then secondly be instructed to present the same finger at a second rotation. The second instruction is preferably presented shortly after the first instruction, such as within a five second time frame. As will be apparent, this will further reduce the risk of spoofing of the verification process due to the limited time available for an imposter to rearrange the fingers in relation to the first and the second instruction. It may in some embodiments be preferred to presenting, by the user output interface, information relating to a reminder of the predetermined time period.

In an alternative embodiment the first finger is different from the second finger, the first and the second instruction are presented essentially simultaneously, and the first and the second portion of the fingerprint information are acquired essentially simultaneously. That is, rather than applying a single finger approach the user may be presented with both the first and the second instruction simultaneously, and the user is then requested to simultaneously position the first and the second finger at the active sensing area of the fingerprint sensing system.

In an embodiment of the present disclosure, the user output interface comprises a display screen having a functional area and the fingerprint sensing system is adapted to acquire fingerprint information of the user's finger within an active sensing area coinciding with at least a majority of the functional area for the display screen. Such a fingerprint sensing system may for example be implemented using ultrasonic technology, where for example a plurality of ultrasonic transducers is to be arranged in the vicinity of a circumference of the display screen.

Preferably, the active sensing area is divided into a plurality of different "zones". The zones may be seen as adjacently arranged e.g. rectangular shaped areas arranged adjacently to each other. Each of the zones may for example be used in conjunction with the acquisition of fingerprint information. Preferably, the first and the second portion of the fingerprint information are acquired at a first and a second zone of the plurality of zones. In addition, the first instruction and the second instruction may for example be presented within a portion of the display screen corresponding to the first and a second zone.

Generally, the concept according to the present disclosure is increasingly advantageous when used in relation to so called large area fingerprint sensors, having an active sensing area covering a major portion of e.g. an area of the display unit (or in some cases touch screen). However, the concept according to the present disclosure may also be useful in relation to smaller fingerprint sensors, such as having a functional area only covering a minor portion of the display unit.

The fingerprint sensing means may, as indicated above, be implemented using any kind of currently or future fingerprint sensing principles, including for example capacitive, optical, thermal or ultrasonic sensing technology. Within the context of the present disclosure, the expression "fingerprint information of a finger of the user" should be interpreted broadly and to include both a regular "visual image" of a fingerprint of a finger as well as a set of measurements relating to the finger when acquired using the fingerprint sensor. A plurality of fingerprint images may be subsequently acquired and fused together, where the resulting information is used as an input for determining the sets of features.

In an alternative embodiment, the fingerprint sensing means is configured to allow the fingerprint information of the user to be acquired throughout a majority of an area covered by the display screen.

In an embodiment of the present disclosure, the electronic device is a mobile phone, a tablet a laptop, and/or possibly a large area interactive screen, etc. The biometric sensor arrangements may for example be used by the user to unlock the electronic device, signing a transaction, etc.

According to the present disclosure, the control unit is preferably an ASIC, a microprocessor or any other type of computing device for controlling the operation of the biometric sensor arrangements. As such, the control unit may form an integral part of the biometric sensor arrangements. It may also be possible to use more than a single control unit. However, the control unit may also be a general control unit comprised with the electronic device, for example configured for controlling the overall operation of the electronic device.

According to another aspect of the present disclosure, there is provided an electronic device, comprising a user output interface, a fingerprint sensing system adapted to acquire fingerprint information of a user's finger, and a control unit, wherein the control unit is adapted to present, by the user output interface, a first instruction to the user for arranging a first finger at a first location with a first rotation, acquire, by the fingerprint sensing system, a first portion of the fingerprint information, determine a first matching level between the first portion of the fingerprint information and a combination of a previously enrolled fingerprint template, the first location and the first rotation, present, by the user output interface, a second instruction to the user for arranging a second finger at a second location with a second rotation, wherein at least one of the second finger, the second location, and the second rotation is different from the first finger, the first location, and the first rotation, respectively, acquire, by the fingerprint sensing system, a second portion of the fingerprint information, determine a second matching level between the second portion of the fingerprint information and a combination of the fingerprint template, the second location and the second rotation, authenticate the user based on the first and the second matching level. This aspect of the present disclosure provides similar advantages as discussed above in relation to the previous aspect of the present disclosure.

According to a further aspect of the present disclosure, there is provided a computer program product comprising a non-transitory computer readable medium having stored thereon computer program means for authenticating a user by means of an electronic device comprising a user output interface, a fingerprint sensing system adapted to acquire fingerprint information of a user's finger and a control unit, wherein the computer program product comprises code for presenting a first instruction, by the user output interface, to the user for arranging a first finger at a first location with a first rotation, code for acquiring, by the fingerprint sensing system, a first portion of the fingerprint information, code for determining, by the control unit, a first matching level between the first portion of the fingerprint information and a combination of a previously enrolled fingerprint template, the first location and the first rotation, code for presenting a second instruction, by the user output interface, to the user for arranging a second finger at a second location with a second rotation, wherein at least one of the second finger, the second location, and the second rotation is different from the first finger, the first location, and the first rotation, respectively, code for acquiring, by the fingerprint sensing system, a second portion of the fingerprint information, code for determining, by the control unit, a second matching level between the second portion of the fingerprint information and a combination of the fingerprint template, the second location and the second rotation, code for authenticating, by the control unit, the user based on the first and the second matching level. Also this aspect of the present disclosure provides similar advantages as discussed above in relation to the previous aspects of the present disclosure.

As mentioned above, the control unit is preferably an ASIC, a microprocessor or any other type of computing device. Similarly, a software executed by the control unit for operating the presently disclosed functionality may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled user. Like reference characters refer to like elements throughout.

Embodiments described herein provide one or more fingerprint sensors that are incorporated with an electronic device. The fingerprint sensor can employ any type of sensing technology, including, but not limited to, capacitive, piezoelectric, and ultrasonic sensing technologies. In one embodiment, a single fingerprint can be captured at one time at a single pre-defined fixed location on a display. In another embodiment, a single fingerprint can be acquired at one time at any location on a display. In other embodiments, multiple touches on the display can be acquired substantially simultaneously where only one fingerprint is captured at a time or where all of the fingerprints are acquired at the same time.

Directional terminology, such as "top", "bottom", "front", "back", "leading", "trailing", etc., is used with reference to the orientation of the Fig(s) being described. Because components of embodiments described herein can be positioned in a number of different orientations, the directional terminology is used for purposes of illustration only and is in no way limiting. When used in conjunction with layers of a display or device, the directional terminology is intended to be construed broadly.

Figure 1:
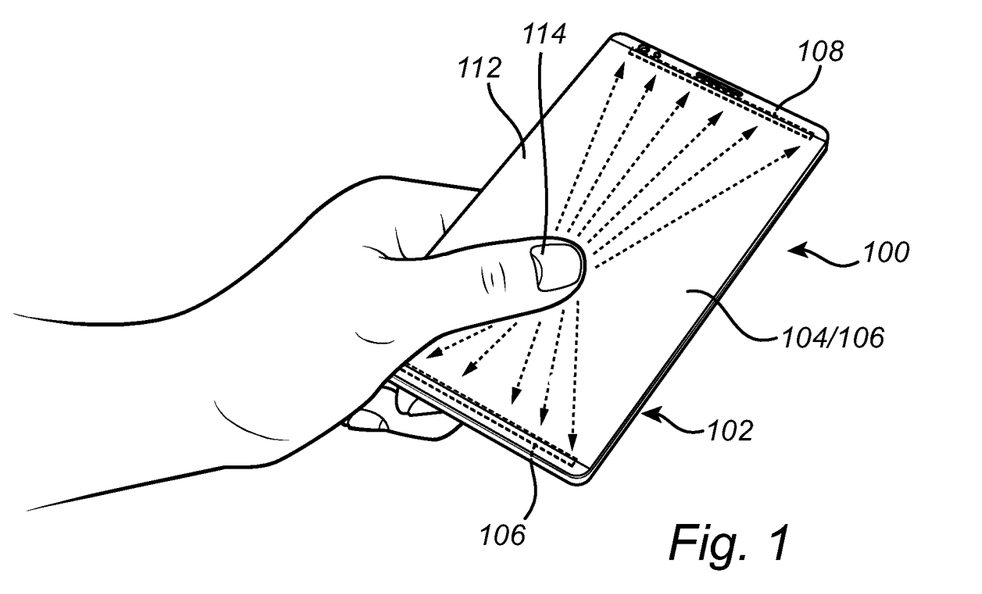
FIG. 1 is an illustration of an exemplary electronic device comprising a fingerprint sensor according to an embodiment of the present disclosure, the electronic device presented in the form of a mobile phone.

Turning now to the drawings and to FIG. 1 in particular, there is schematically illustrated an example embodiment of the electronic device according to the present disclosure, in the form of a mobile phone 100 with an integrated fingerprint sensor 102 and a display unit 104 comprising a touch screen 106. In this embodiment, the fingerprint sensor 102 and the display unit 104/touch screen 106 are together arranged at the front side of the mobile phone 100. The fingerprint sensor 102 may, for example, be used for unlocking the mobile phone 100 and/or for authorizing transactions carried out using the mobile phone, etc.

In the example presented in FIG. 1, the fingerprint sensor is implemented to apply ultrasonic technology to acquire a fingerprint image of a finger of a user. The fingerprint sensor 102 may in accordance to the present disclosure for example be implemented using an ultrasonic transducer device including e.g. a first piezoelectric element and a second piezoelectric element, each having first and second transducer electrodes that are both connectable from one side of the ultrasonic transducer device. The mobile phone 100 further comprises a control unit (not explicitly shown) adapted for processing fingerprint image data acquired using the fingerprint sensor 102.

It should be understood that the concept as is provided in line with the present disclosure also or instead may be used in relation to fingerprint sensors employing different technologies, such as e.g. capacitive, optical, etc. as has been mentioned above. Generally, the concept according to the present disclosure is increasingly advantageous when used in relation to so called large area fingerprint sensors, having a functional (or active sensing) area covering a major portion of e.g. an area of the touch screen 106. However, the concept according to the present disclosure may also be useful in relation to smaller fingerprint sensors, such as having a functional area only covering a minor portion of the touch screen 106.

As is schematically indicated in FIG. 1, the fingerprint sensor 102 comprises a first ultrasonic transducer array 106, a second ultrasonic transducer array 108, where the control unit is connected to the first 106 and second 108 ultrasonic transducer arrays.

The first ultrasonic transducer array 106 and the second ultrasonic transducer array 108 are both acoustically coupled to a device member, such as a glass cover 112 of the display unit 104/touch screen 106. The user touch is indicated by the thumb 114 in FIG. 1.

When the fingerprint sensor 102 is in operation, the control unit 110 controls one or several piezoelectric element(s) comprised in at least one of the first 106 and the second 108 ultrasonic transducer arrays to transmit an acoustic transmit signal. Further, the control unit controls at least one of the first 106 and the second 108 ultrasonic transducer arrays to receive acoustic interaction signals, indicated by the dashed arrows in FIG. 1. The acoustic interaction signals are indicative of interactions between the transmit signal and the interface between the cover glass 112 and the skin of the user (thumb 114). The acoustic interaction signals may then be transformed to electrical signals by the receiving piezoelectric elements in the first 106 and/or second 108 ultrasonic transducer arrays, and the electrical signals are processed by the control unit to provide a representation of the fingerprint of the user.

It should be understood that the "representation" of the fingerprint of the user may be any information extracted based on the received acoustic interaction signals, which is useful for assessing the similarity between fingerprint representations acquired at different times. For instance, the representation may comprise descriptions of fingerprint features (such as so-called minutiae) and information about the positional relationship between the fingerprint features. Alternatively, the representation may be a fingerprint image, or a compressed version of the fingerprint image. For example, the image may be binarized and/or skeletonized. Moreover, the fingerprint representation may be the above-mentioned impulse response representation.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should be furthermore be noted that the present disclosure may be applicable in relation to any other type of electronic device, such as a laptop, a remote control, a tablet, computer, IoT/Machine type communication device, or any other type of present or future similarly configured device.

Turning now to FIGS. 2A-2C and FIG. 4, illustrating a first exemplary operation of the mobile phone 100 in conjunction with the present disclosure. The first exemplary operation is provided in relation to a "one finger" authentication, as will be elaborated below.

Figure 2A:
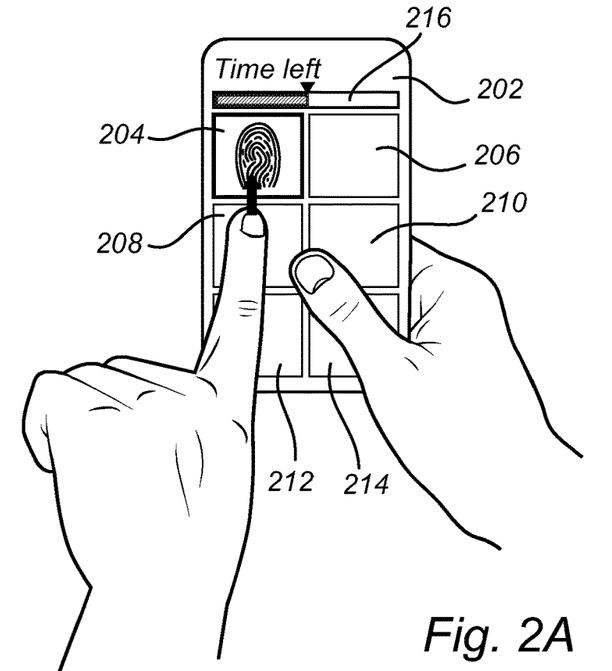
FIGS. 2A-2C illustrates possible steps taken by a user in operating the electronic device according to a first embodiment of the present disclosure.

Specifically, in FIG. 2A it is shown how the user is presented with a first instruction at the display unit 104. The instruction provided through a graphical user interface (GUI) 202 illustrated at the display unit 104. The GUI 202 shows in the exemplary implementation a plurality of "zones" (or areas) in the illustration provided in a matrix formation comprising six zones denoted as 204, 206, 208, 210, 212 and 214. It may of course be possible to allow the GUI 202 to present more or less than six zones.

The first instruction is presented, S1, within the zone 204 (corresponding to the first location as defined above), conceptually illustrated as a fingerprint arranged with a first rotation as compared to a possible coordinate system of the fingerprint sensor 102. In FIG. 2A the user is explicitly requested to position his left index finger at zone 204. In parallel to the instruction presented within the GUI 202, the user is given an indication of how much time he has for completing the positioning of the finger at the first location. The time indication may for example be illustrated using a "time bar" 216 as exemplified.

Once the user has positioned his finger at the first location/zone 204, the control unit will acquire, S2, using the fingerprint sensor 102 first portion of the fingerprint information (e.g. a first partial fingerprint of the finger of the user). The control unit will subsequently process the first portion of the fingerprint information for determining, S3, a first matching level between the first portion of the fingerprint information and a previously enrolled fingerprint template (for the same finger of the user), further dependent on how the finger was rotated. That is, in a previous operation of the mobile phone 100, the finger of the user has been enrolled though an enrollment scheme, resulting in a fingerprint template that may be used for authenticating the user.

It should be understood that the enrollment scheme may differ and may be dependent on the technology used for acquiring the fingerprint information (e.g. partial fingerprint). Some fingerprint sensing technologies may, as indicated above, be rotationally dependent, meaning that the rotation of the finger in relation to the mentioned coordinate system for the fingerprint sensor 102 is of high interest. That is, different rotation of the finger in relation to the coordinate system may in such implementation give different results (within limits). Thus, once the user is again instructed to position his finger with a specific rotation at the specific location (zone), the actual rotation will affect the matching process. Thus, in such an implementation, in case the user is not following the instruction to positon the finger with a specific rotation, the matching will (likely) be unsuccessful, meaning that the matching level typically will be low.

Other types of technology used for fingerprint sensing may not be dependent on the rotation of the finger in relation to the coordinate system of the fingerprint sensor. However, it may be possible (and in some embodiments desirable) to e.g. make use of the touch screen 106 for determining how the user is rotating his finger. Accordingly, this concept may thus be used e.g. in the matching process for ensuring the user is correctly rotating his finger when the fingerprint information is to be acquired.

Subsequently, the user may be presented, S4, with a second instruction to arrange his finger at or adjacently to the surface of the fingerprint sensor 102. In the illustration provided in FIG. 2B the user is now requested to present the same finger as was previously requested at zone 210, i.e. not at the same location as was previously requested in relation to the first instruction, with a second rotation. As may be seen in FIG. 2B, the second rotation (in comparison to the coordinate system of the fingerprint sensor 102) of the finger is different compared to the first rotation. Arranging the finger at different rotations (for subsequently acquired portions of fingerprint information) may allow for a reduced possibility to spoof the authentication process.

Figure 2B:
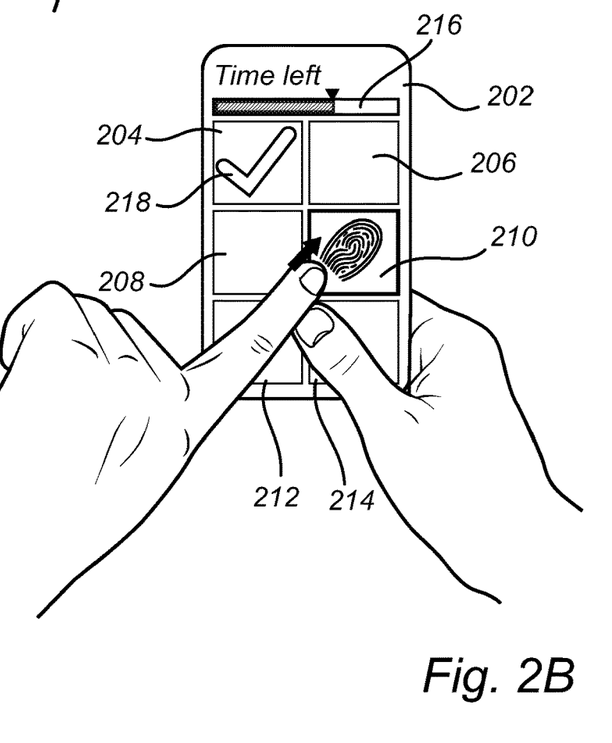

It should be understood that the user may be requested to use different fingers in relation to the first and the second instruction provided at the GUI 202.

In FIG. 2B it is also optionally presented an indication of that the first portion of the fingerprint information has been acquired at the first location, i.e. zone 204, e.g. using a check mark 218.

Again, the control unit operates the fingerprint sensor 102 to acquire, S5, fingerprint information, now a second portion of the fingerprint information. Furthermore, the control unit determines, S6, a second matching level between the second portion of the fingerprint information and previously enrolled fingerprint template, further dependent on the rotation of the finger. As previously illustrated, the user may again be given an indication of how much time he has to complete the positioning of his finger at the second position with the second rotation. In case the user is not positioning his finger correctly within the dictated time frame, the authentication process may be "stopped" and the authentication of the user refused.

Figure 2C:
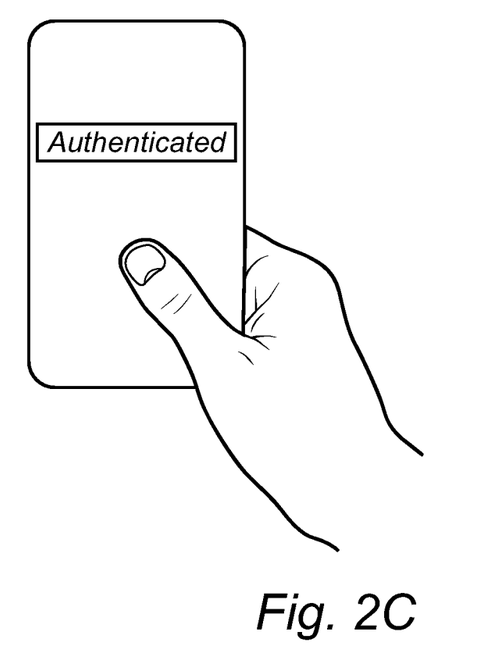

Subsequently, as shown in FIG. 2C, the control unit will authenticate, S7, the user based on the first and the second matching level. For example, it may be possible to allow the authentication to only be successful in case both of the first and the second matching level is above a first and a second (e.g. similar) threshold, respectively. In another example it may be possible to combine the first and the second matching level (addition, multiplication) and then compare the result to a "common" threshold. Such an implementation may allow for one of the acquired portion of fingerprint information to be "slightly inferior" to what is normally desired, however in case the second portion of the fingerprint information is slightly above what is normally desired then the combination of the two may still be enough for exceeding the combined threshold. Other implementations for e.g. correlating the first and the second matching level with one or a plurality of thresholds are possible and within the scope of the present disclosure.

Figure 3A:
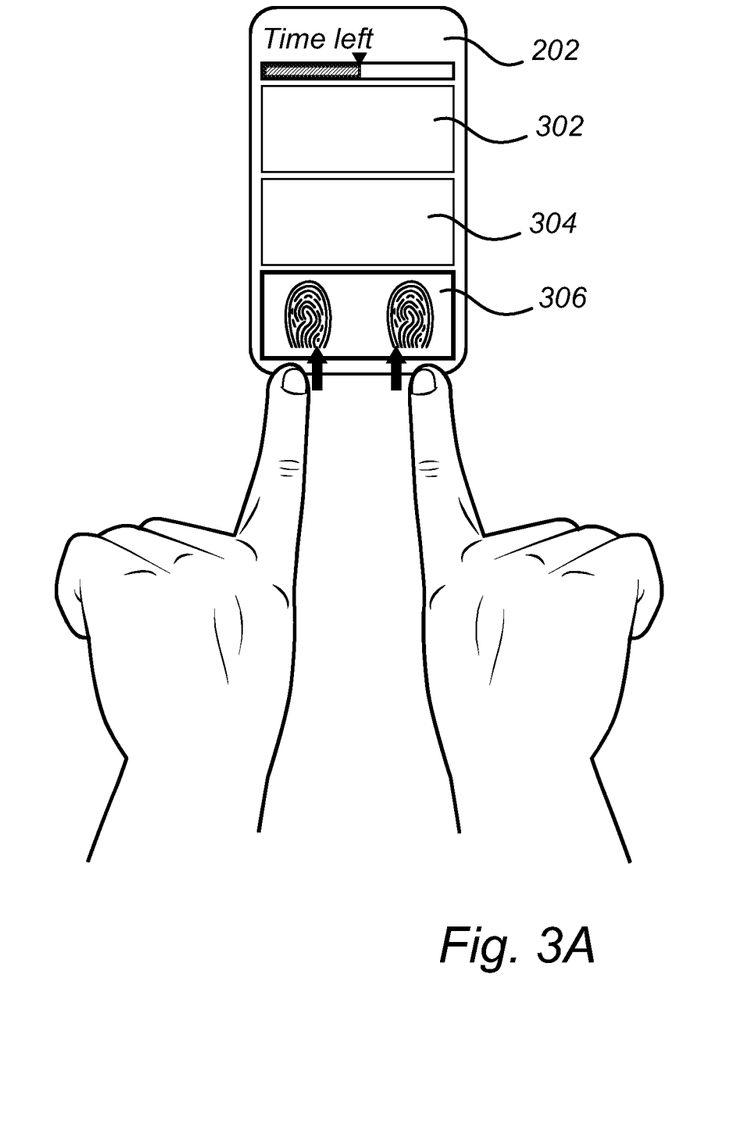
FIGS. 3A-3C illustrates possible steps taken by the user in operating the electronic device according to a second embodiment of the present disclosure and FIG. 4 is a flowchart schematically illustrating the operation as is presented in FIGS. 2A-2C and FIGS. 3A-3C.
Figure 3B:
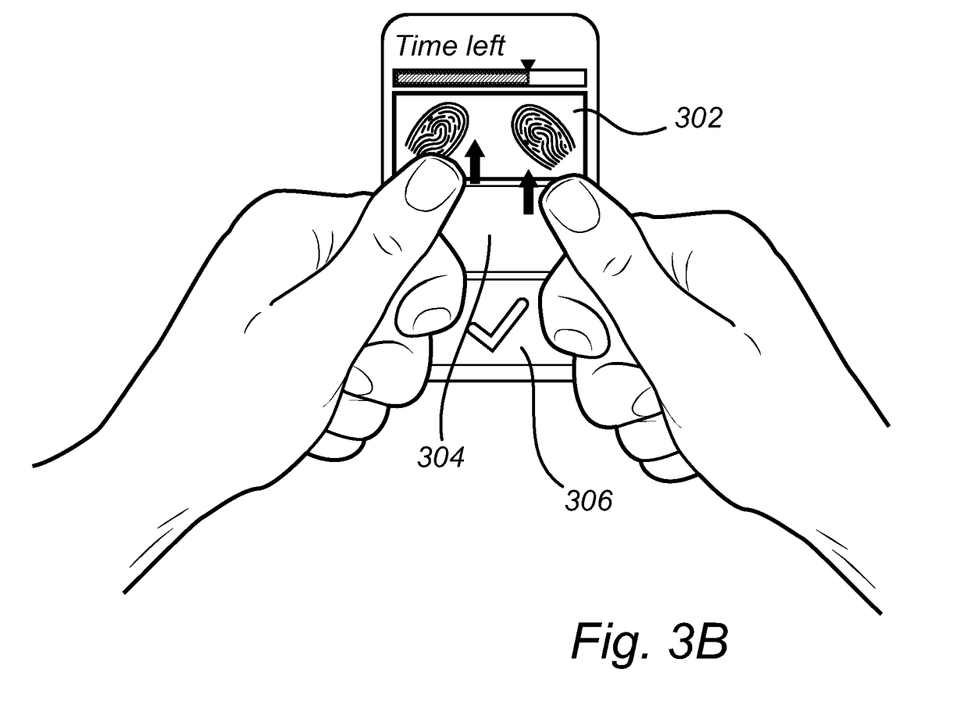
Figure 3C:
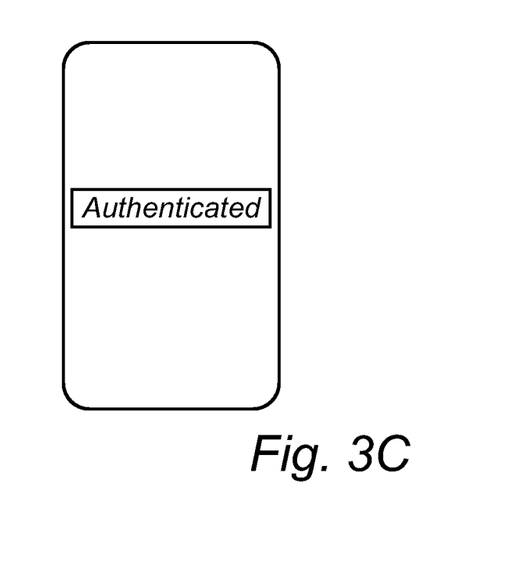
Figure 4:
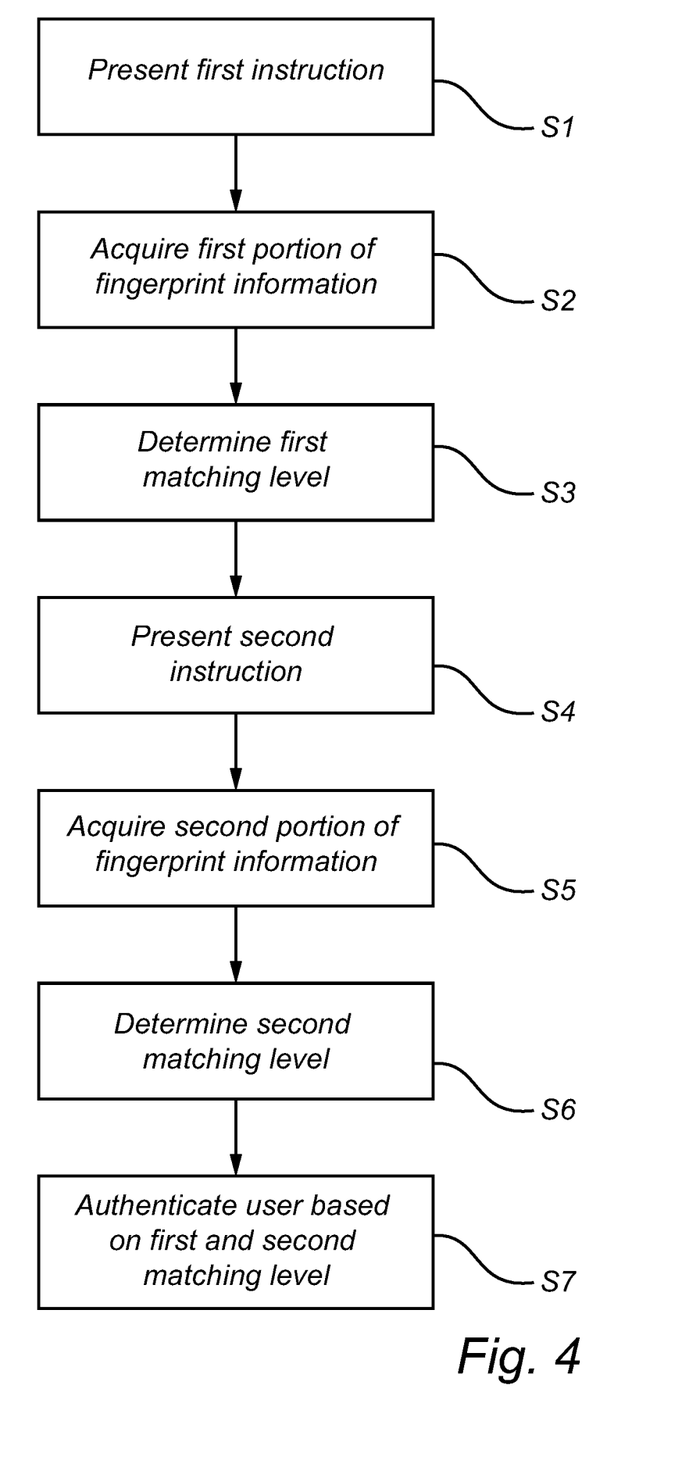

FIGS. 3A-3C provides a second exemplary embodiment of operation of the mobile phone 100 in line with the concept according to the present disclosure. As compared to the first exemplary embodiment as shown in FIGS. 2A-2C, the second exemplary embodiment shows a "two finger" authentication, as will be elaborated below. Specifically, in FIGS. 3A-3B the GUI 202 is illustrated to comprise three zones 302, 304 and 306.

To start with, the user will be provided with a first instruction to present his two index fingers at a first location with a first rotation, specifically within zone 306. The instruction is again provided using a stylistic illustration of a first and a second fingerprint representing how and where the user is to position his fingers. Again, a first matching level is to be determined.

In FIG. 3B the user is now requested to position his fingers at a second location, specifically within zone 302 with a specific rotation. However, as compared to FIG. 3A where the index fingers were to be presented at the fingerprint sensor 102, the user is now requested to position his thumbs (i.e. both left and right) within zone 302. As would be apparent, not previously knowing which finger to position at what location will greatly reduce the possibility of spoofing the authentication process provided in line with the present disclosure.

It should be understood that any combination of fingers may be requested to be position at the fingerprint sensor 102. That is, e.g. two or even further fingers from the same hand may be requested to be positioned at the fingerprint sensor 102, or e.g. two fingers from one hand and one finger from the other hand.

Once the second portion of the fingerprint information has been acquired, the second matching level is to be determined. In line with the above discussion in relation to FIGS. 2A-2C, the authentication, as exemplified in FIG. 3C, will subsequently be based on the first and the second matching level, possibly in combination or compared separately.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of authenticating a user by means of an electronic device comprising a user output interface, a fingerprint sensing system adapted to acquire fingerprint information of a user's finger and a control unit, wherein the method comprises the steps of:

presenting a first instruction, by the user output interface, to the user for arranging a first finger at a first location with a first rotation, acquiring, by the fingerprint sensing system, a first portion of the fingerprint information, determining, by the control unit, a first matching level between the first portion of the fingerprint information and a combination of a previously enrolled fingerprint template, the first location and the first rotation, presenting a second instruction, by the user output interface, to the user for arranging a second finger at a second location with a second rotation, wherein at least one of the second finger, the second location, and the second rotation is different from the first finger, the first location, and the first rotation, respectively, acquiring, by the fingerprint sensing system, a second portion of the fingerprint information, determining, by the control unit, a second matching level between the second portion of the fingerprint information and a combination of the fingerprint template, the second location and the second rotation, authenticating, by the control unit, the user based on the first and the second matching level.

2. The method according to claim 1, wherein:
the first finger is the same as the second finger, and
the second instruction is presented subsequently the first instruction after a predetermined time period.

3. The method according to claim 2, wherein the predetermined time period is less than 5 seconds.

4. The method according to claim 2, further comprising the step of:
presenting, by the user output interface, a reminder of the predetermined time period.

5. The method according to claim 1, wherein:
the first finger is different from the second finger,
the first and the second instruction are presented essentially simultaneously, and
the first and the second portion of the fingerprint information are acquired essentially simultaneously.

6. The method according to claim 1, wherein the user output interface comprises a display screen having a functional area and the fingerprint sensing system is adapted to acquire fingerprint information of the user's finger within an active sensing area coinciding with at least a majority of the functional area for the display screen.

7. The method according to claim 6, wherein the fingerprint sensing system comprises a plurality of ultrasonic transducers in the vicinity of a circumference of the display screen.

8. The method according to claim 6, wherein the active sensing area is divided into a plurality of zones.

9. The method according to claim 8, wherein the first and the second portion of the fingerprint information are acquired at a first and a second zone of the plurality of zones.

10. The method according to claim 9, wherein the first instruction and the second instruction are presented within a portion of the display screen corresponding to the first and the second zone.

11. An electronic device, comprising:
a user output interface;
a fingerprint sensing system adapted to acquire fingerprint information of a user's finger, and
a control unit,
wherein the control unit is adapted to:
present, by the user output interface, a first instruction to the user for arranging a first finger at a first location with a first rotation,
acquire, by the fingerprint sensing system, a first portion of the fingerprint information,
determine a first matching level between the first portion of the fingerprint information and a combination of a previously enrolled fingerprint template, the first location and the first rotation,
present, by the user output interface, a second instruction to the user for arranging a second finger at a second location with a second rotation, wherein at least one of the second finger, the second location, and the second rotation is different from the first finger, the first location, and the first rotation, respectively,
acquire, by the fingerprint sensing system, a second portion of the fingerprint information,
determine a second matching level between the second portion of the fingerprint information and a combination of the fingerprint template, the second location and the second rotation,
authenticate the user based on the first and the second matching level.

12. The electronic device according to claim 11, wherein the user output interface comprises a display screen.

13. The electronic device according to claim 12, wherein the fingerprint sensing system is configured to allow the fingerprint information of the user to be acquired throughout a majority of an area covered by the display screen.

14. The electronic device according to claim 11, wherein the fingerprint sensing system is employing at least one of optical, thermal and ultrasonic sensing technology.

15. The electronic device according to claim 11, wherein the electronic device is a mobile phone, a tablet or a laptop.

* * * * *